（12）United States Patent
Ide

(10) Patent No.: US 6,972,879 B2
(45) Date of Patent: Dec. 6, 2005

(54) IMAGE SCANNING APPARATUS

(75) Inventor: Naoaki Ide, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 906 days.

(21) Appl. No.: 09/983,442

(22) Filed: Oct. 24, 2001

(65) Prior Publication Data

US 2003/0076554 A1    Apr. 24, 2003

(51) Int. Cl.[7] ............................................. H04N 1/46
(52) U.S. Cl. ...................... 358/514; 358/512; 358/523; 358/528; 358/505; 358/483
(58) Field of Search ................. 358/512–514, 358/528, 525, 505, 497, 483, 482, 445, 451, 358/449, 463, 494, 474, 506, 487, 523, 444; 382/298, 299, 318, 319, 312, 162, 167; 250/208.1, 250/234–236

(56) References Cited

U.S. PATENT DOCUMENTS

| | | | | |
|---|---|---|---|---|
| 4,999,717 A | * | 3/1991 | Nagashima | 358/448 |
| 5,189,529 A | * | 2/1993 | Ishiwata et al. | 358/451 |
| 5,398,117 A | * | 3/1995 | Suzuki et al. | 358/451 |
| 5,535,007 A | * | 7/1996 | Kim | 358/296 |
| 5,555,107 A | * | 9/1996 | Funada et al. | 358/518 |

FOREIGN PATENT DOCUMENTS

JP        5-75792        3/1993

* cited by examiner

Primary Examiner—Cheukfan Lee
(74) Attorney, Agent, or Firm—Foley & Lardner LLP

(57) ABSTRACT

With the present invention, by changing the scanning timing of a CCD line sensor in accordance with the amount of scanning misregistration corresponding to a magnification, misregistration of less than one line can be accurately corrected, thereby eliminating degradation of MTF, which has occurred in conventional apparatuses.

11 Claims, 11 Drawing Sheets

| Scaling magnification (%) | 95 | 96 | 97 | 98 | 99 | 100 | 101 | 102 | 103 | 104 | 105 | 106 |
|---|---|---|---|---|---|---|---|---|---|---|---|---|
| CCD line sensor pitch (line) between R-G, G-B | 7.6 | 7.68 | 7.76 | 7.84 | 7.92 | 8.00 | 8.08 | 8.16 | 8.24 | 8.32 | 8.4 | 8.48 |

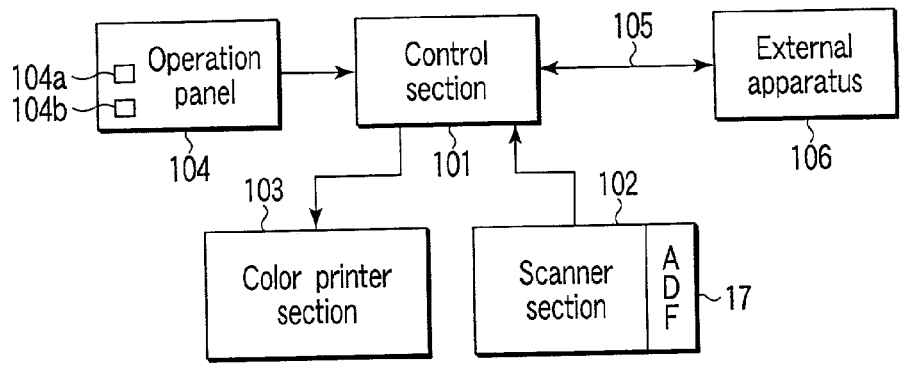
F I G. 1
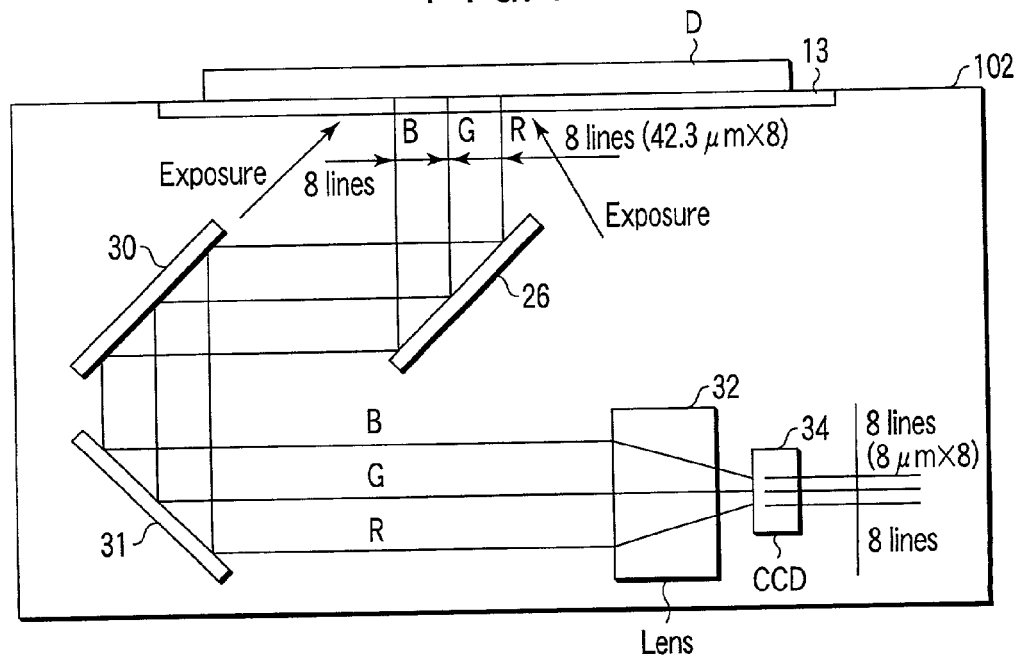
F I G. 4
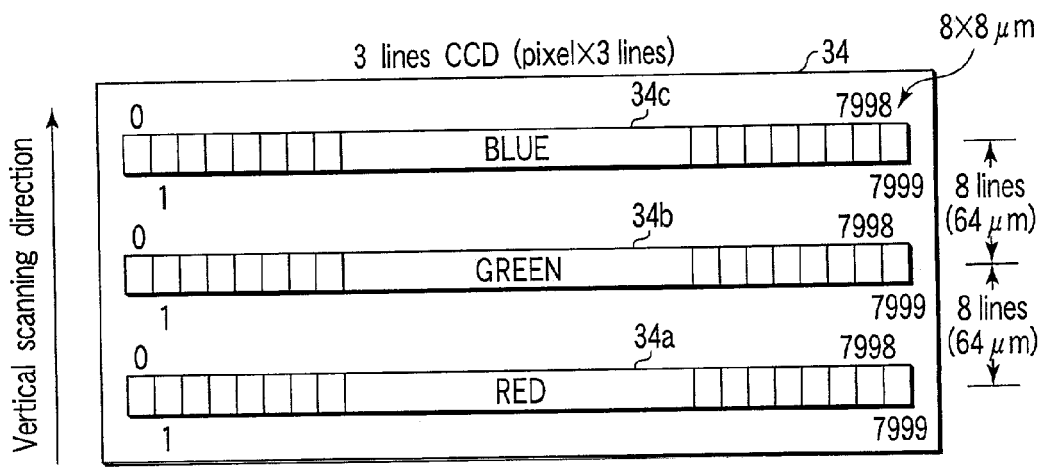
F I G. 5

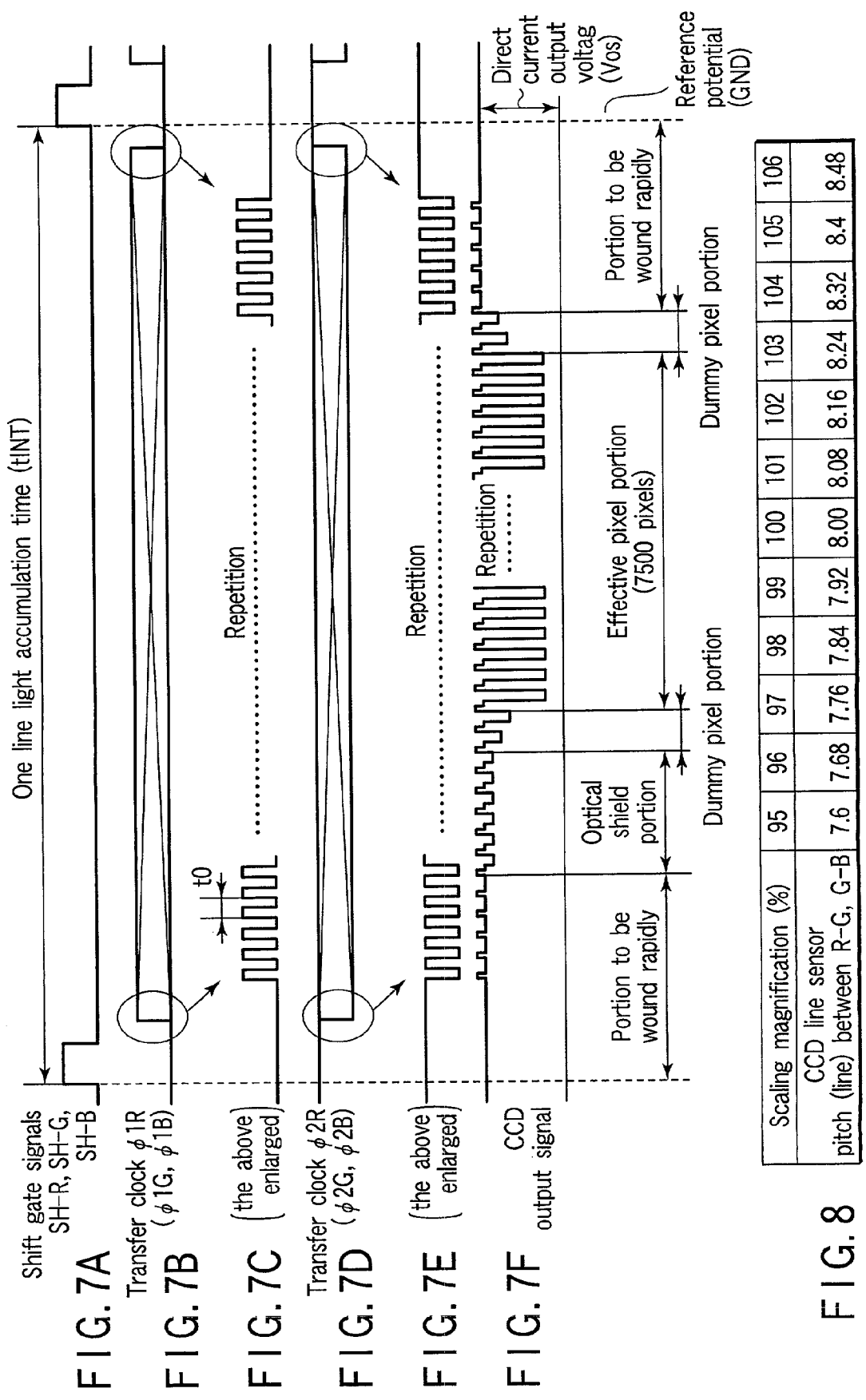

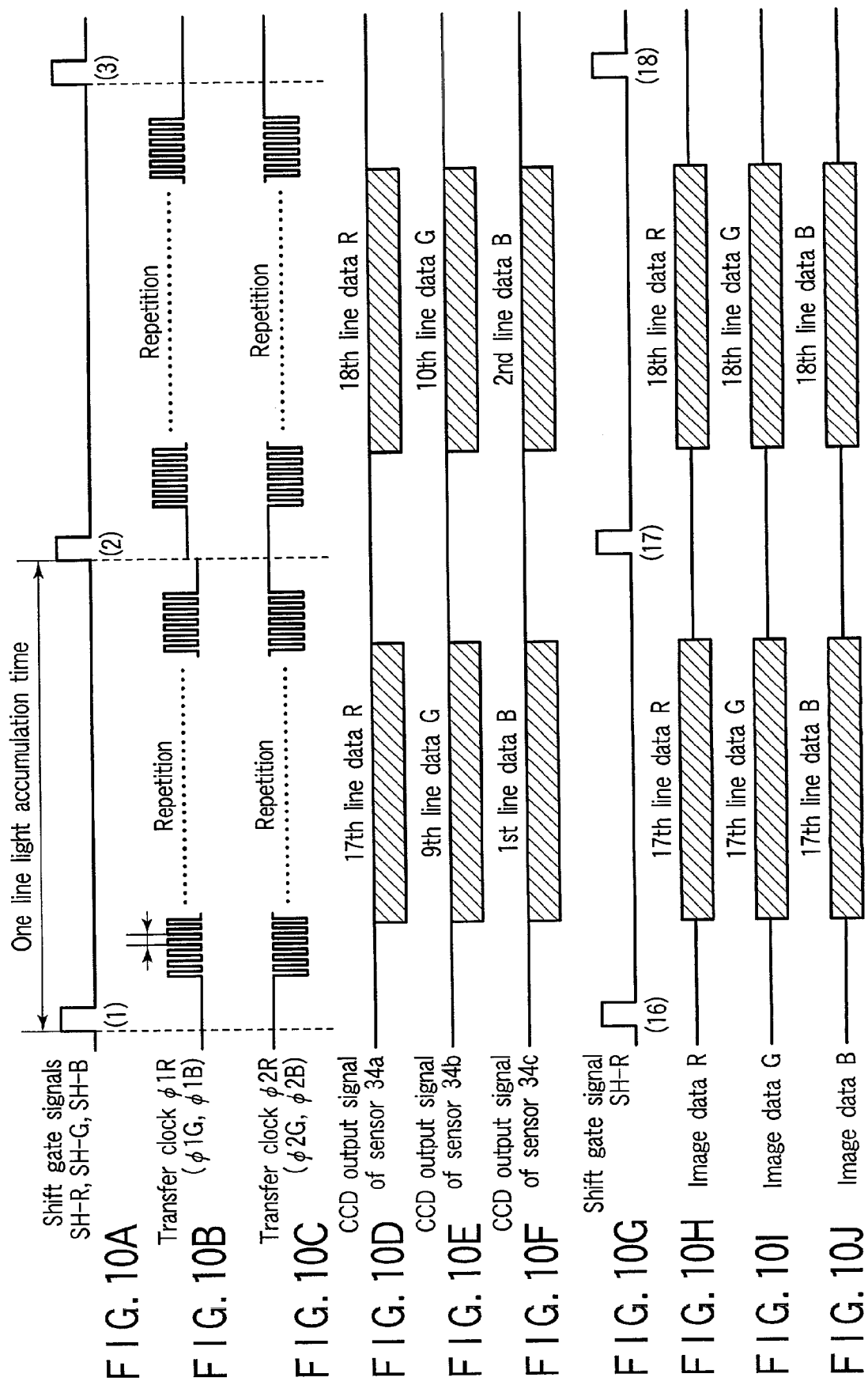

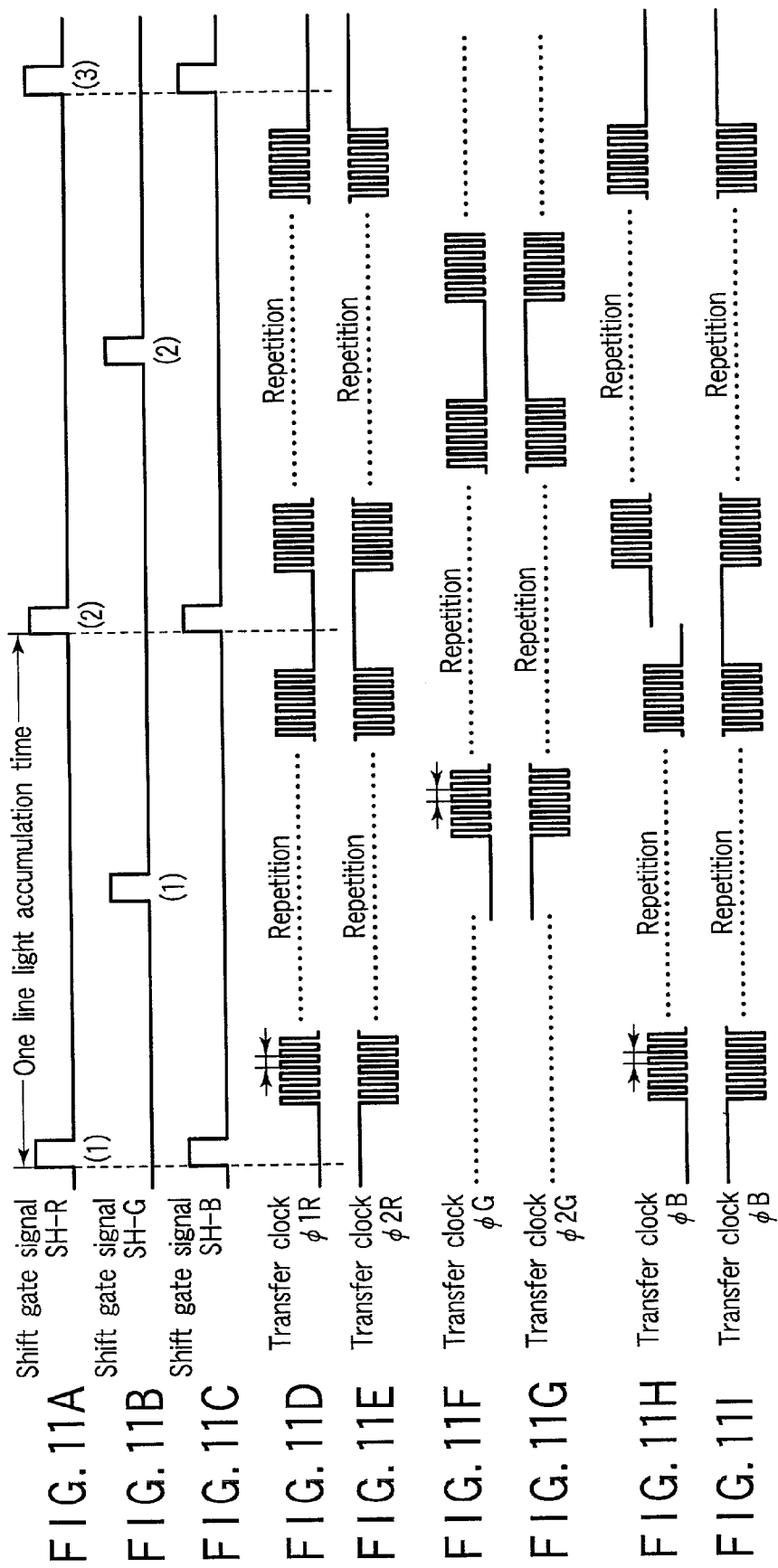

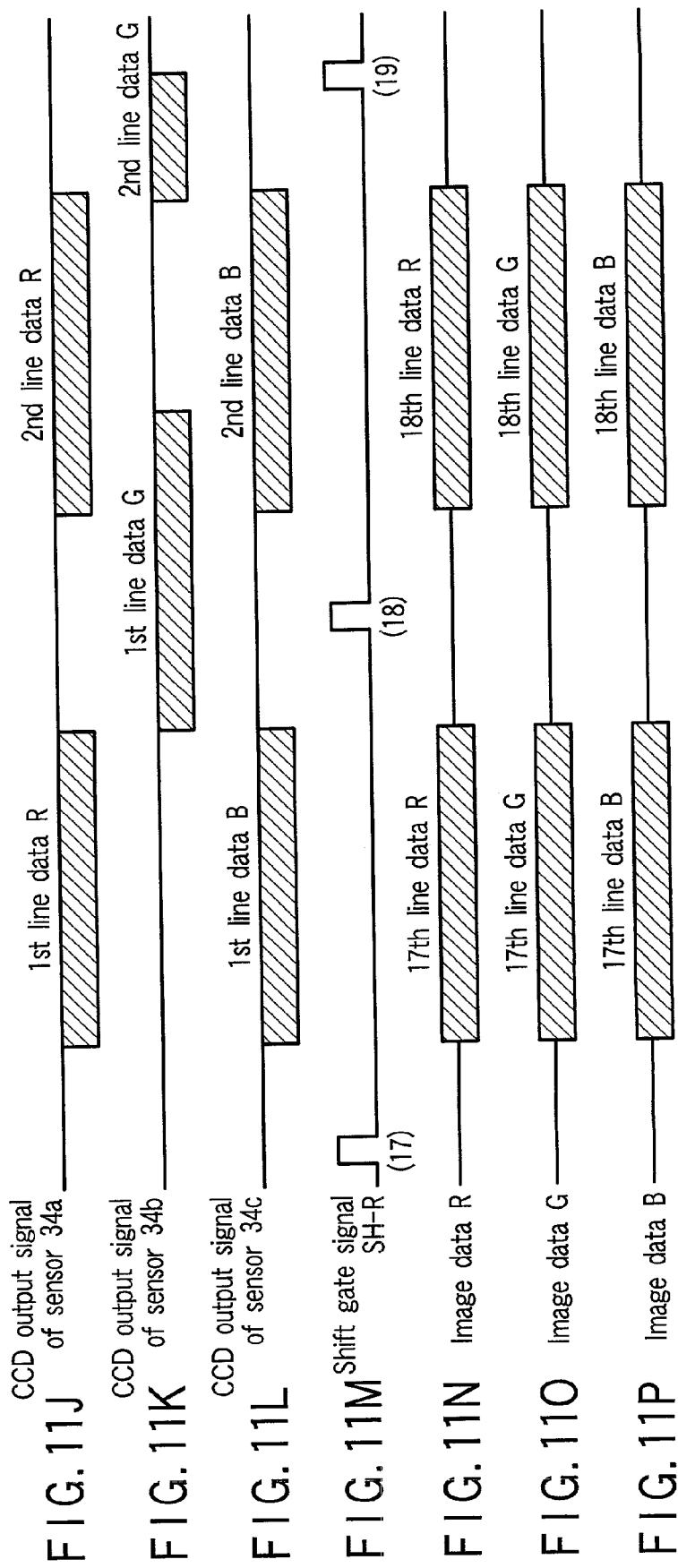

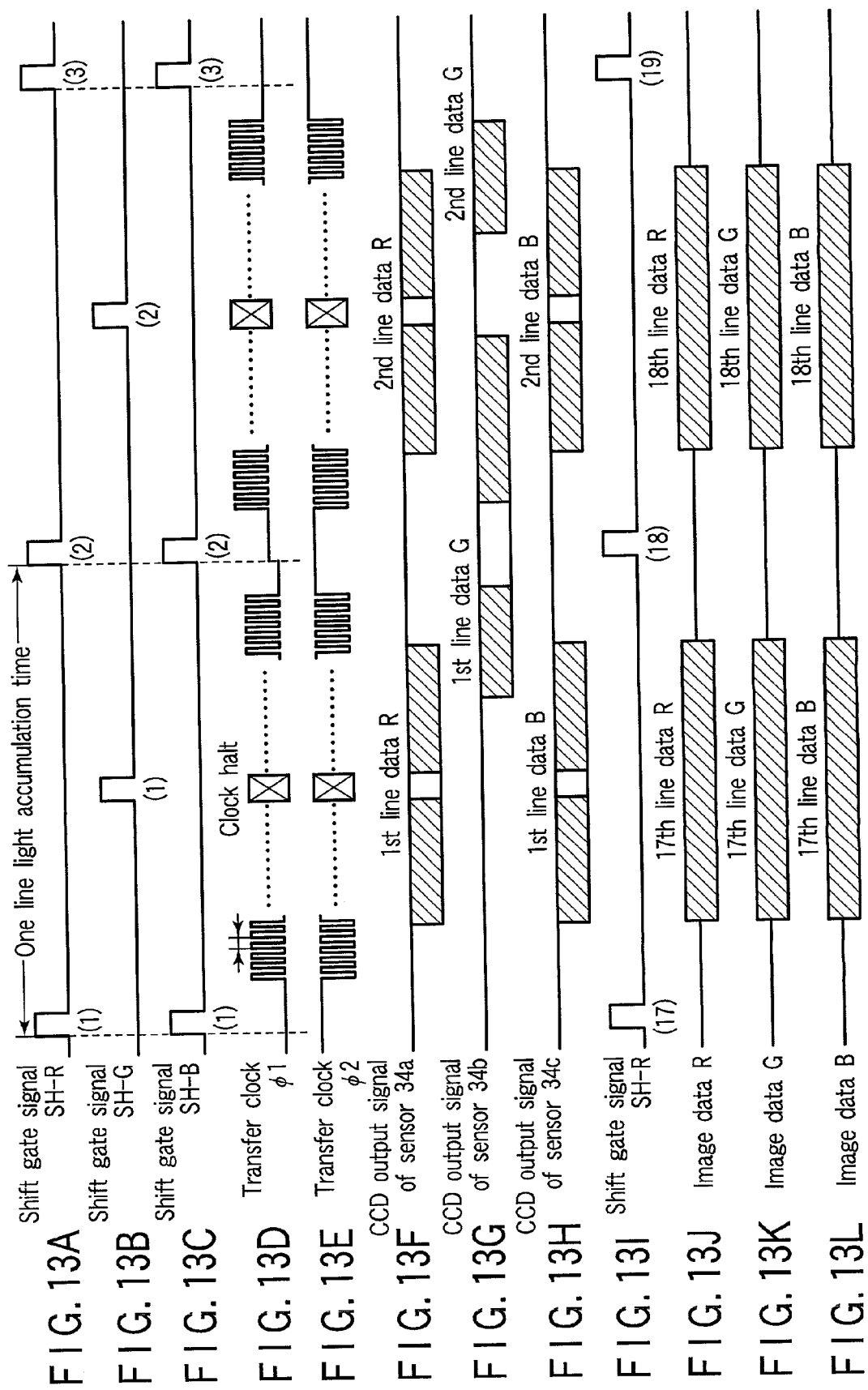

IMAGE SCANNING APPARATUS

BACKGROUND OF THE INVENTION

1. Field of the Invention

The present invention relates to an image scanning apparatus, such as a scanner, which scans an original image, wherein light from a light source is irradiated onto an original document, and the reflected light thereof is guided by an optical system such as a mirror, thereby the original image is formed by three CCD line sensors of R (red), G (green) and B (blue).

2. Description of the Related Art

Recently, image scanning apparatuses, such as scanners, which scan an original image, have been put to practical use, wherein light from a light source is irradiated onto an original document, and the reflected light thereof is guided by an optical system such as a mirror, thereby the original image is formed by three CCD line sensors of R (red), G (green) and B (blue).

At this time, the light from the light source is irradiated onto an original image, and the reflected light thereof is guided to each CCD sensor via a plurality of mirrors.

A color image forming apparatus having such a scanner has been proposed.

That is to say, in Jpn. Pat. Appln KOKAI Publication No. 5-75792, there is proposed a color image forming apparatus comprising a light source which irradiates light onto a document, color separation means for optically separating the reflected light or transmitted light from the document into a plurality of colors, image scanning means for converting each color-separated light into an electric signal by a plurality of photoelectric transfer means and outputs the electric signal, and image recording means for storing a color image based on the electric signal from the image scanning means, which is characterized by having storage means for storing beforehand misregistration of the image formed by the separated lights, due to a relative positional error or the like of the plurality of photoelectric transfer means, delay means for delaying the output electric signal from each photoelectric transfer means, and delayed amount control means for setting the delayed amount by the delay means in accordance with the output of the storage means.

In this manner, as measures against scanning misregistration of the color CCD sensor, heretofore, the signal after the photoelectric transfer is delayed to prevent the scanning misregistration, to thereby prevent the color difference of the output image. Moreover, in the case of performing scaling by a color plain paper copier, in the vertical scanning direction, there are generally a method of performing scaling by changing the scanning rate of the scanner, and a method of performing scaling by means of image processing. With the method of changing the scanning rate of the scanner, since the color CCD sensor has such a construction that a plurality of line sensors are arranged at a certain pitch, scanning misregistration occurs in the vertical scanning direction. In order to correct this misregistration, there is known a method in which correction by a multiple of the line sensor pitch is performed by a line memory in accordance with the scanning rate, and correction of less than one line is presumed from the peripheral pixels.

With the above-described related art, correction is performed based on a value after scanning. Therefore, correction in a unit of line is possible, but correction of less than one line has to be performed based on a value calculated by taking a weight average from the front and back two pixels, since the actual misregistration image cannot be taken in. With this method, there is a problem in that the MTF (Modulation Transfer Function) deteriorates due to taking the weight average.

BRIEF SUMMARY OF THE INVENTION

It is an object of the present invention to provide an image scanning apparatus which does not require fine registration adjustment by the optical system, and does not cause color difference, in a scanning apparatus which scans a color document image, using a plurality of CCD sensors.

In order to achieve the above object, the document scanning apparatus of the present invention comprises: a scanning section which reads and scans a document line by line in the horizontal scanning direction thereof, with a relative movement of the document in the vertical scanning direction; a shift mechanism which shifts the scanning section and the document relative to each other in the vertical scanning direction of the document at various speeds based on the scanning magnification; a CCD line sensor for the color red, to which an image for each line is guided from the scanning section, to convert it into pixel signals of a plurality of pixels based on the density of the red color component; a CCD line sensor for the color green provided parallel with the CCD line sensor for the color red with a predetermined distance therebetween, to which an image for each line is guided from the scanning section, to convert it into pixel signals of a plurality of pixels based on the density of the green color component; a CCD line sensor for the color blue provided parallel with the CCD line sensor for the color green with a predetermined distance therebetween, to which an image for each line is guided from the scanning section, to convert it into pixel signals of a plurality of pixels based on the density of the blue color component; a memory section which stores beforehand alienation time comprising a line unit component and a pixel unit component between the respective CCD line sensors, in such a state that the scanning section and the document are relatively shifted by the shift mechanism, at a different speed based on various scanning magnifications; a modification section which, at the time of scanning at a predetermined scanning magnification, reads the alienation time between the respective CCD line sensors based on this magnification, and modifies the output timing of the pixel signal from the each CCD line sensor, based on the pixel unit component of this readout alienation time; and a delay section which delays the pixel signal in a unit of one line, obtained by changing the output timing of the pixel signal from the each CCD line sensor by the modification section, by the line unit component of the alienation time.

BRIEF DESCRIPTION OF THE SEVERAL VIEWS OF THE DRAWING

FIG. 1 is a block diagram showing the schematic construction of a color image forming apparatus comprising a scanner section, as one example of an image scanning apparatus of the present invention;

FIG. 4 is a sectional view showing the schematic construction of the scanner section;

FIGS. 5 and 6 are diagrams showing the construction of a CCD line sensor;

FIGS. 7A to 7F are timing charts showing a signal in the main part of the CCD line sensor;

FIG. 8 is a diagram showing the relation of pitches between a scaling rate and the CCD line sensors;

FIGS. 10A to 10J are timing charts showing the timing of the CCD output and pixel data output, when the magnification is 100%;

FIGS. 11A to 11P are timing charts showing the timing of the CCD output and pixel data output, when the magnification is 106%;

FIGS. 13A to 13L are timing charts showing the timing of the CCD output and pixel data output, when the magnification is 106%.

Figure 2:
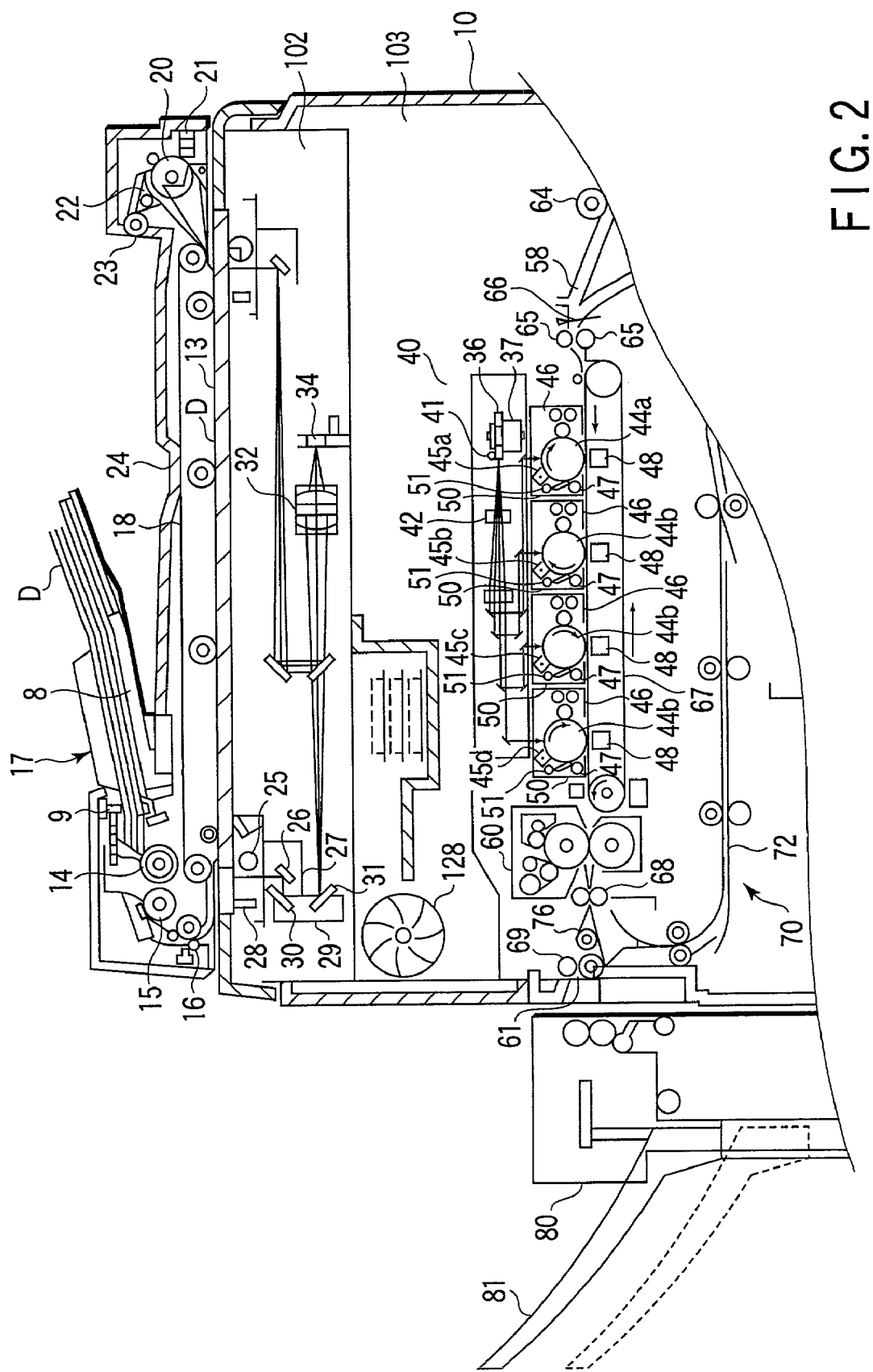
FIGS. 2 and 3 are sectional views showing the schematic construction of the color image forming apparatus, respectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The image forming apparatus according to an embodiment of the present invention will now be described with reference to the drawings.

FIG. 1 is a block diagram for explaining a color digital copying machine 1 comprising a scanner section, as one example of an image scanning apparatus of the present invention. As shown in FIG. 1, the color digital copying machine 1 comprises a control section (CPU) 101, a scanner section 102 having an automatic document feeder (ADF) 17 described below, a color printer section 103, and an operation panel 104, and is connected to an external apparatus 106 such as a personal computer, via a line 105 such as a LAN.

The control section (CPU) 101 is to control the whole color digital copying machine 1.

The scanner section 102 is to read the image information of an object to be copied (not shown) placed on a document table by the automatic document feeder (ADF) 17 as contrast of light, to thereby generate an image signal.

The color printer section 103 is to form an image corresponding to the image signal supplied from the scanner section 102 or the external apparatus 106.

The operation panel 104 is to perform various setting.

Figure 3:
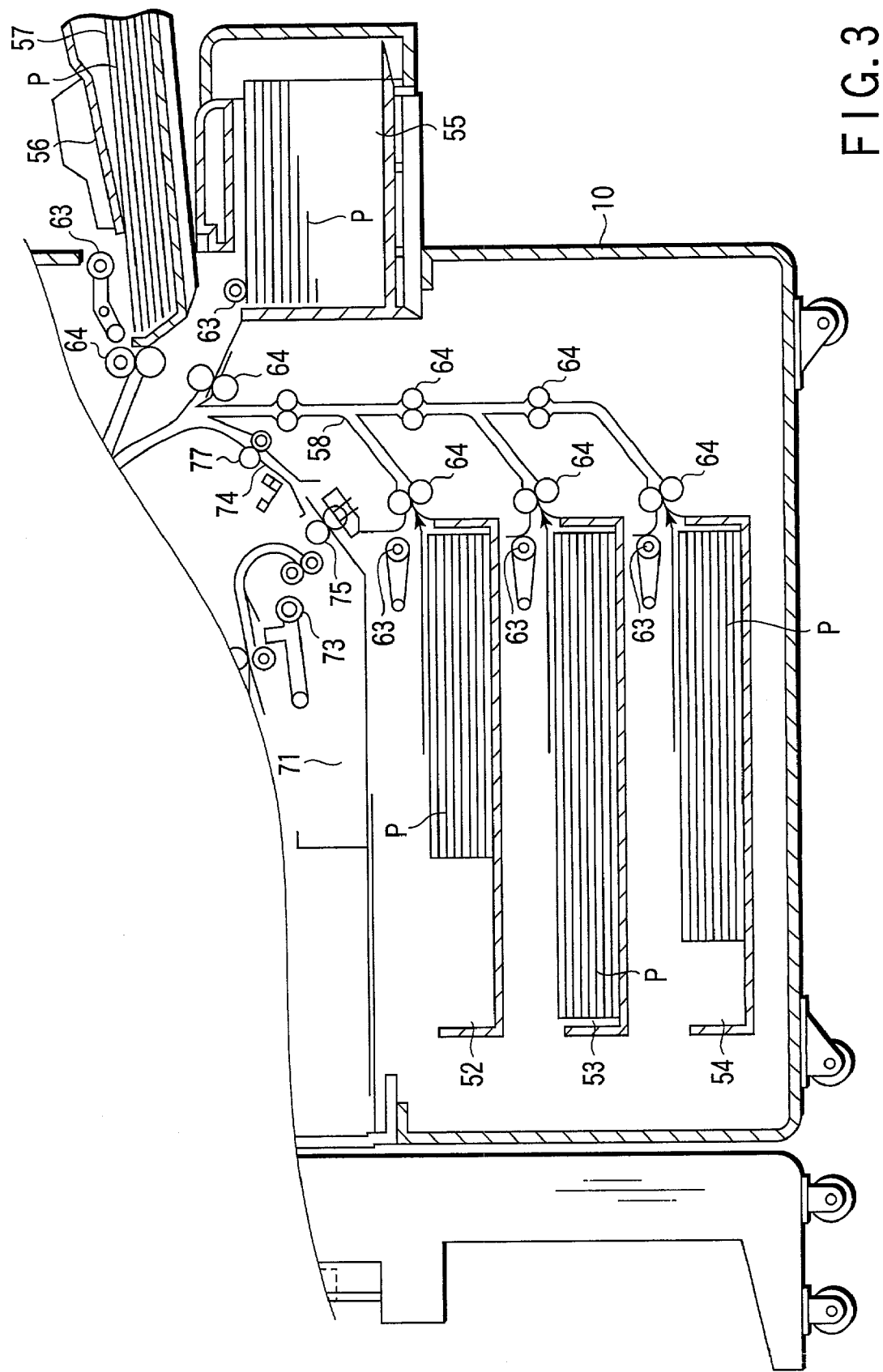

FIGS. 2 and 3 are diagrams showing the inner structure, respectively, for explaining the color digital copying machine 1.

On the upper part of the apparatus body 10, the automatic document feeder (hereinafter referred to as "ADF") 17 which also serves as a cover, and feeds a document in sheet form one by one, is provided so as to be freely opened or closed. A platen may be attached as the cover instead of this ADF 17. On the front upper face of the apparatus body 10, there is provided an operation panel 104 comprising various operation keys for instructing copying conditions and copy start or setting the magnification, and various displays.

On the right side of the apparatus body 10, a paper feed cassette 57 which can store paper in a small quantity, and a large capacity paper feed cassette 55 which can store paper in a large quantity are provided respectively detachably. The paper feed cassette 57 comprises a manual feed tray 56 to supply paper manually.

On the lower part of the apparatus body 10, there are provided paper feed cassettes 52, 53 and 54 detachably. In each paper feed cassette, sheets of paper in the same size are stored in the horizontal direction and in the vertical direction, so as to be selected according to need. On the left side of the apparatus body 10, there is provided a finisher 80 to receive copied paper.

In the apparatus body 10, there are provided the scanner section 102 as obtaining means for obtaining image data, and the color printer section 103 as image forming means, for realizing the copying function and the facsimile function.

On the upper face of the apparatus body 10, there are arranged a document table 13 comprising a transparent glass, on which an object to be scanned, that is, a document D is placed, and the ADF 17 for automatically feeding the document D onto this document table 13. This ADF 17 is arranged freely openably with respect to the document table 13, and also functions as a cover for bringing the document D placed on the document table 13 into intimate contact with the document table 13.

The ADF 17 comprises a document tray 8 where the document D is set, an empty sensor 9 which detects the presence of the document, a pick-up roller 14 to pick up the document D one by one from the document tray 8, a feed roller 15 for carrying the picked up document D, a registration roller pair 16 for registering the tip of the document D, a registration sensor (not shown) provided on the upstream side of the registration roller pair 16 to detect when the document D arrives, a size sensor (not shown) to detect the size of the document D, and a carrier belt 18 arranged so as to cover substantially the whole document table 13. Plural sheets of documents set upwards in the document tray 8 are picked up sequentially from the lowest paper, that is, from the last page, registered by the registration roller pair 16, and then transferred to a predetermined position on the document table 13 by the carrier belt 18.

In the ADF 17, a reversing roller 20, a non-reversing sensor 21, a flapper 22, and a feeder output roller 23 are arranged at the end portion on the side opposite to the registration roller pair 16, putting the carrier belt 18 therebetween. The document D whose image information has been scanned by the scanner section 102 described later is carried from the document table 13 by the carrier belt 18, onto a document ejection section 24 on the upper face of the ADF 17, via the reversing roller 20, the flapper 22, and the feeder output roller 23.

In the case of scanning the reverse of the document D, by changing over the flapper 22, the document D carried by the carrier belt 18 is reversed by the reversing roller 20, and carried again to a predetermined position on the document table 13 by the carrier belt 18.

The ADF 17 comprises a paper feed motor to drive the pick-up roller 14, the feed roller 15 and the registration roller pair 16, and a carrier motor to drive the carrier belt 18, the reversing roller 20, and the feeder output roller 23.

The scanner section 102 arranged in the apparatus body 10 has, as shown in FIGS. 2 and 4, a light source 25, such as a fluorescent lamp, to illuminate the document D placed on the document table 13, and a first mirror 26 to deflect the reflected light from the document D to a predetermined direction. These light source 25 and first mirror 26 are mounted on a first carriage 27 arranged below the document table 13. On this first carriage 27, there is mounted the size sensor 28 to detect the size of the document placed on the document table 13. The first carriage 27 is movably arranged parallel with the document table 13, and is moved back and forth below the document table 13, by a drive motor via a toothed belt or the like (not shown).

Moreover, a second carriage 29 is movably arranged parallel with the document table 13, below the document table 13. On the second carriage 29, there are mounted a second mirror 30 and a third mirror 31 at a right angle with respect to each other, which sequentially deflects the reflected light from the document D, which has been deflected by the first mirror 26. The second carriage 29 is driven with respect to the first carriage 27 by a toothed belt which drives the first carriage 27, and is also moved parallel with the first carriage 27 along the document table 13, at a rate of half the rate of the first carriage 27.

Also, below the document table 13, there are arranged an image formation lens 32 which focuses the reflected light from the third mirror 31 on the second carriage 29, and a CCD line sensor 34 comprising three CCD line sensors 34a, 34b and 34c, which receives the reflected light focused by the image formation lens 32 and performs photoelectric exchange therewith. The image formation lens 32 is arranged movably via a drive mechanism within a plane including the optical axis of the light deflected by the third mirror 31, and forms an image of the reflected light at a desired magnification (in the horizontal scanning direction). The CCD line sensors 34a, 34b and 34c photoelectrically exchange the incident reflected light, in accordance with a shift gate signal and an image processing clock (transfer clock) provided from a red color signal processing section (SALT) 122, a green color signal processing section (SALT) 123 and a blue color signal processing section (SALT) 124, and outputs an electric signal corresponding to the scanned document D. The magnification in the vertical scanning direction can correspond thereto, by changing the transfer speed by means of the ADF 17 or the moving speed of the first carriage 27.

The light from the light source 25 respectively corresponds to the CCD line sensors 34a, 34b and 34c, and a difference in the scanning timing is corrected by means of the shift gate signal, a timing of the transfer clock and a circuit in the latter step.

When the document D carried by the ADF 17 is scanned, the irradiation position of the light source 25 is fixed to a position shown in FIG. 1. Moreover, when the document D placed on the document table 13 is scanned, the irradiation position of the light source 25 is shifted from the left to the right along the document table 13.

On the other hand, the color printer section 103 comprises a laser exposure apparatus 40 serving as the exposure means. The laser exposure apparatus 40 comprises a semiconductor laser 41 as a light source, a polygon mirror 36 as a scanning member which continuously deflects the laser beam emitted from the semiconductor laser 41, a polygon motor 37 as a scanning motor which rotates and drives the polygon mirror 36 at a predetermined number of revolution described later, and an optical system 42 which deflects and guides the laser beam from the polygon mirror 36 to photosensitive drums 44a to 44d described above. The laser exposure apparatus 40 having such a construction is secured and supported by a support frame (not shown) of the apparatus body 10.

The semiconductor laser 41 is ON/OFF controlled according to the image information of the document D scanned by the scanner section 102, and this laser beam is respectively directed to the photosensitive drums 44a to 44d via the polygon mirror 36 and the optical system 42, and by scanning the peripheral face of the photosensitive drums 44a to 44d, an electrostatic latent image is formed on the peripheral face of each photosensitive drums 44a to 44d.

The image forming section 12 has the freely rotatable photosensitive drums 44a to 44d as an image carrier arranged substantially in the center of the apparatus body 10, and a desired electrostatic latent image is exposed and formed on the peripheral face of each photosensitive drums 44a to 44d, by the laser beam from the laser exposure apparatus 40.

On the periphery of the photosensitive drums 44a to 44d, there are arranged sequentially: electrification chargers 45 which respectively charge the peripheral face of the photosensitive drums 44a to 44d to a predetermined charge; developers 46 which supply toner as a developer to the electrostatic latent image formed on the peripheral face of the photosensitive drums 44a to 44d to develop the image at a desired image density; peeling chargers 47 to separate a material to be transferred (recording medium) that is, the copy paper P fed from a paper feed cassette 52, 53, 54, 55 or 57 from the photosensitive drums 44a to 44d; transfer chargers 48 which make the toner image formed on the photosensitive drums 44a to 44d to be transferred onto the paper P; a peeling claw (not shown) which peels the copy paper P from the peripheral face of the photosensitive drums 44a to 44d; cleaning devices 50 which clean the toner remaining on the peripheral face of the photosensitive drums 44a to 44d; and discharging devices 51 which discharge the peripheral face of the photosensitive drums 44a to 44d.

Image forming units 45a to 45d are constituted of each above described photosensitive drum 44a (44b to 44d) and each peripheral equipment, respectively.

In this example of the invention, in order to overlap four colors of the Y image, M image, C image and B image, from the upstream side in the direction that an optional point of the carrier belt 67 is moved, that is, in the direction that the copy paper P is carried, each image forming unit 45a to 45d is arranged in the order of Y, M C and B.

In the lower part of the apparatus body 10, the paper feed cassettes 52, 53 and 54 capable of being pulled out from the apparatus body 10, respectively, are arranged in the laminated state, and copy paper having a different size is loaded in each cassette 52, 53 and 54. The large-capacity paper feed cassette 55 is provided by the side of these cassettes 52, 53 and 54, and in this large-capacity paper feed cassette 55, copy paper having a size which is most frequently used, for example, A4 size copy paper is stored in an amount of about 3000 sheets. Moreover, above the large-capacity paper feed cassette 55, the paper feed cassette 57 also serving as the manual tray 56 is detachably mounted.

In the apparatus body 10, there is formed a carrier passage 58 extending from each cassette through a transfer section located between photosensitive drums 44a to 44d and the transfer chargers 48, and at the end of the carrier passage 58, there is provided a fixation apparatus 60. On the sidewall of the apparatus body 10 facing the fixation apparatus 60, an ejection port 61 is formed, and the finisher 80 is mounted in the ejection port 61.

In the vicinity of the paper feed cassettes 52, 53, 54, 55 and 57, a pick-up roller 63 which picks up the paper from the cassette one by one is provided, respectively. In the carrier passage 58, there are provided a plurality of feed roller pairs 64 which carry the copy paper P picked up by the pick-up roller 63 through the carrier passage 58.

On the upstream side of the photosensitive drums 44a to 44d in the carrier passage 58, a resist roller pair 65 is provided. The resist roller pair 65 corrects the inclination of the picked up copy paper P, registers the end of the toner image on the photosensitive drums 44a to 44d with the end of the copy paper P, and feeds the copy paper P to the transfer section at the same speed as the moving speed of the peripheral face of the photosensitive drums 44a to 44d. This side of the resist roller pair 65, that is, on the feed roller 64 side, an aligning sensor 66 which detects the arrival of the copy paper P is provided.

The copy paper P picked up one by one from each cassette by the pick-up roller 63 is carried to the resist roller pair 65 by the feed roller pair 64. Then, after the end of the copy paper P is registered by the resist roller pair 65, the copy paper P is carried to the transfer section by the carrier belt (transfer belt) 67.

In the transfer section, the developer image formed on the photosensitive drums 44a to 44d, that is, the toner image is transferred to the paper P by the transfer charger 48. The copy paper P on which the toner image has been transferred is peeled off from the periphery of the photosensitive drums 44a to 44d by the action of the peeling charger 47 and the peeling claw (not shown), and carried to the fixation apparatus 60 via the carrier belt 67 which constitutes a part of the carrier passage 58. Then, after the developer image has been fused and fixed on the copy paper P by the fixation apparatus 60, the copy paper P is ejected to a feeder output tray 81 of the finisher 80 via the ejection port 61 by the feed roller pair 68 and the ejection roller pair 69.

Below the carrier passage 58, there is provided an automatic reversing apparatus (ADD) 70 which reverses the copy paper P having passed the fixation apparatus 60 and sends it again to the resist roller pair 65. The automatic reversing apparatus 70 comprises a temporary accumulation section 71 which accumulates the copy paper P temporarily, a reversing passage 72 separated from the carrier passage 58, which reverses the copy paper P having passed the fixation apparatus 60 and guides to the temporary accumulation section 71, a pick-up roller 73 which picks up the copy paper P accumulated in the temporary accumulation section one by one, and a feed roller 75 which feeds the picked up paper to the resist roller pair 65 via a carrier passage 74. Moreover, at the branching section of the carrier passage 58 and the reversing passage 72, there is provided a distribution gate 76 which selectively distributes the copy paper P to the ejection port 61 or to the reversing passage 72.

In the case where two-sided copy is to be performed, the copy paper P having passed the fixation apparatus 60 is guided to the reversing passage 72 by the distribution gate 76, and temporarily accumulated in the temporary accumulation section 71 in the reversed state, and then carried to the resist roller pair 65 via the carrier passage 74, by the pick-up roller 73 and the feed roller pair 75. After having been registered by the resist roller pair 65, the copy paper P is carried again to the transfer section, so that the toner image is transferred to the back face of the copy paper P. Thereafter, the copy paper P is ejected to the feeder output tray 81 in the finisher 80, via the carrier passage 58, the fixation apparatus 60 and the ejection roller 69.

By using this automatic reversing apparatus 70, it is also possible to eject the paper with the printed face of the paper facing downwards. That is to say, at first, the image is transferred and fixed on the surface of the paper in the manner that the two-sided copy is performed, the paper is accumulated temporarily in the temporary accumulation section 71, passed through the carrier passage 74 by the pick-up roller 73 and the feed roller pair 75 and registered by the resist roller pair 77, and then, ejected to the feeder output tray 81 in the finisher 80, via the carrier passage 58, the fixation apparatus 60 and the ejection roller 69.

The three CCD line sensors 34a, 34b and 34c described above are for RED, for GREEN and for BLUE in the order of from the bottom, as shown in FIG. 5. For example, the CCD line sensors 34a, 34b and 34c are configured to have 8000 pixels, respectively, and arranged on one printed board, parallel therewith.

The size per one pixel of the CCD line sensors 34a, 34b and 34c is 8×8 $\mu$m, and the number of pixels in one line is 8000. The 8000 pixels are constituted of an effective pixel area formed by 7500 pixels, and a dummy pixel area formed by 250 pixels on the both sides thereof. The interval between the CCD line sensors 34a, 34b and 34c for each color is 64 $\mu$m, and it corresponds to an 8-line interval, calculated as the number of pixels of the CCD line sensors 34a, 34b and 34c.

At this time, the 8 lines in the document D on the document table 13 correspond to 8 lines per 42.3 $\mu$m, as shown in FIG. 4. At the time of scanning by the ADF 17 at the equal magnification, movement of the document D by 42.3 $\mu$m corresponds to one line.

Therefore, in the case where the original image is scanned at the equal magnification, there is a difference of 8 lines in the vertical scanning direction, at the document scanning position between the CCD line sensors 34a, 34b and 34c for each color. Hence, in order to obtain the image information for the same line in the original image, this line difference has to be corrected in the data. Therefore, in the case where the original image is scanned at the equal magnification, the CCD line sensors 34a, 34b and 34c for each color scan the image of the original image away from each other by 8 lines. Hence, it is necessary to correct the line difference in the data, in order to obtain the image information for the same line on the original image.

If it is assumed that the scanning order of the same line in the original image is in the order of from RED to GREEN to BLUE (in the order of from the CCD line sensor 34a, 34b and 34c), in order to obtain the image data for the same line with the image that is now being scanned with the BLUE CCD line sensor, the GREEN image needs only to be delayed by 8 lines, and the RED image needs only to be delayed by 16 lines. Moreover, when an enlarged image at 400% is to be obtained by changing the shift speed of the scanning position to ¼, it is necessary to delay the GREEN image by 32 lines, and the RED image by 64 lines. Conversely, when a reduced image at 50% is to be obtained by making the shift speed double, the GREEN image needs only to be delayed by 4 lines, and the RED image by 8 lines.

Figure 6:
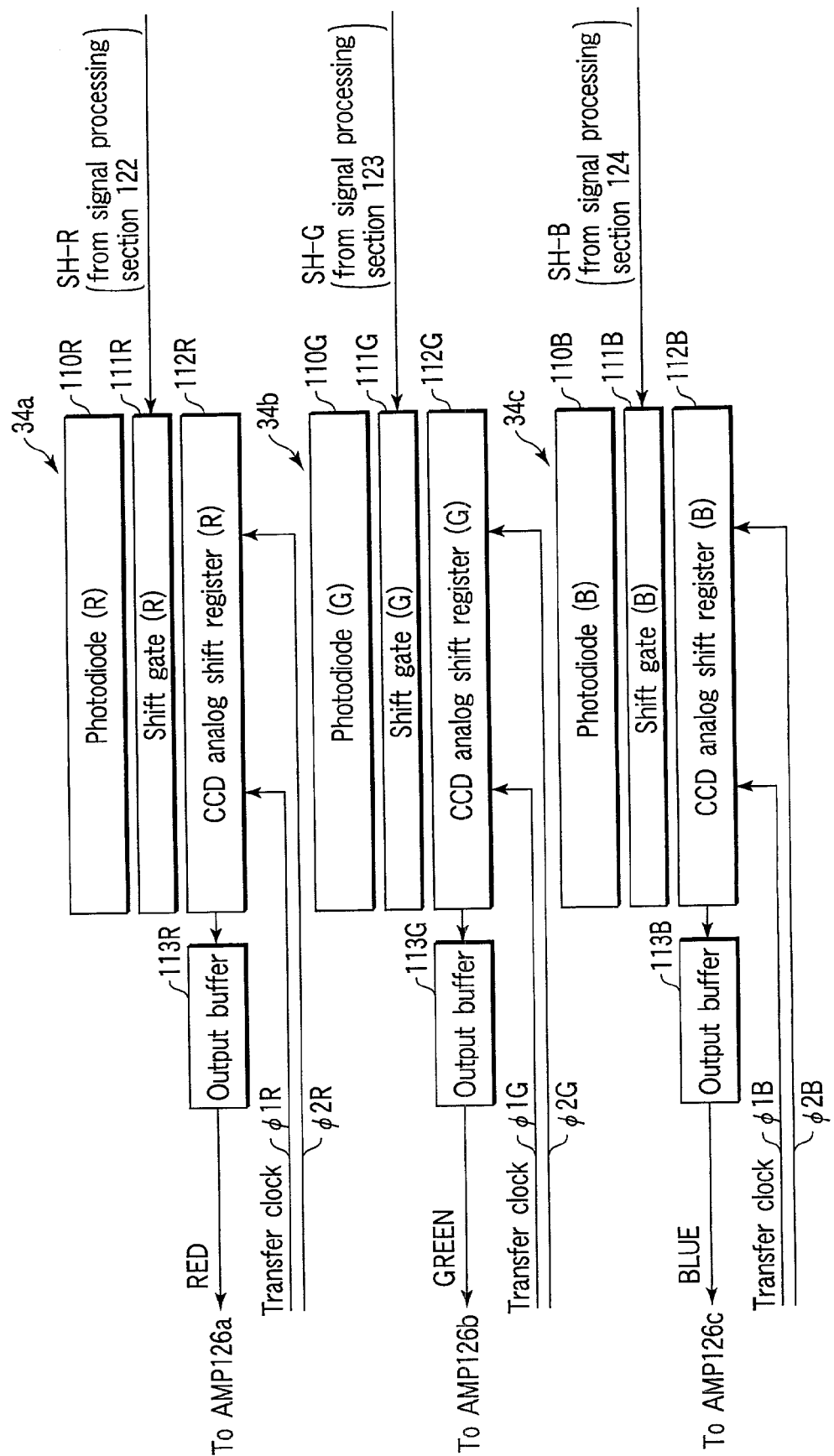

The CCD line sensors 34a, 34b and 34c are configured by photodiodes 110R, 110G and 110B, shift gates 111R, 111G and 111B, CCD analog shift registers 112R, 112G and 112B, and output buffers 113R, 113G and 113B, as shown in FIG. 6.

The photodiodes 110R, 110G and 110B are to perform photoelectric exchange of the original image, and the photoelectrically exchanged electric charge for each pixel is respectively output to the shift gates 111R, 111G and 111B.

The shift gates 111R, 111G and 111B are to transfer the photoelectrically exchanged electric charge to the CCD analog shift registers 112R, 112G and 112B, respectively, based on the shift gate signals SH-R, SH-G and SH-B, shown in FIG. 7A. The shift gate signals SH-R, SH-G and SH-B are output by the red color signal processing section (SALT) 122, the green color signal processing section (SALT) 123 and the blue color signal processing section (SALT) 124, for each light accumulation time (tINT) for one line. The shift gate signals SH-R, SH-G and SH-B can be supplied independently for each shift gate 111R, 111G and 111B, to thereby independently control the transfer timing.

The CCD analog shift registers 112R, 112G and 112B output the electric charge for one line sequentially pixel by pixel to the output buffers 113R, 113G and 113B, based on the transfer clock (charge transfer clock) $\phi 1R$, $\phi 2R$, $\phi 1G$, $\phi 2G$, $\phi 1B$ and $\phi 2B$ shown respectively in FIGS. 7B to 7E. The transfer clock $\phi 2R$ ($\phi 2G$, $\phi 2B$) are the reversed phase (opposite phase) of the transfer clock $\phi 1R$, ($\phi 1G$, $\phi 1B$).

The transfer clock $\phi 1R$, $\phi 2R$, $\phi 1G$, $\phi 2G$, $\phi 1B$ and $\phi 2B$ are supplied from a clock generation section (not shown), so as to be supplied independently for each CCD analog shift register 112R, 112G, 112B, so that the transfer timing can be controlled separately.

The output buffers 113R, 113G and 113B are to output the electric charge transferred, respectively, from the CCD analog shift registers 112R, 112G and 112B as a voltage signal (CCD output signal), as shown in FIG. 7F.

For example, the CCD output signal is in the order of from an idle portion, an optical shield portion, a dummy pixel portion, an effective pixel portion, a dummy pixel portion and an idle portion, between the shift gate signals.

These CCD line sensors 34a, 34b and 34c perform scanning processing, taking into consideration a difference in the scanning timing in the horizontal scanning direction and in the vertical scanning direction.

FIG. 8 shows the relation of the pitch (line) between the respective CCD line sensors 34a, 34b and 34c, based on the scaling magnification described above.

The interval between the CCD line sensor 34a and the CCD line sensor 34b, and the interval between the CCD line sensor 34b and the CCD line sensor 34c respectively change as follows according to the magnification.

For example, when the magnification is 95%, the interval therebetween is 7.6 lines; when 96%, 7.68 lines; when 97%, 7.76 lines; when 98%, 7.84 lines; when 99%, 7.92 lines; when 100%, 8 lines; when 101%, 8.08 lines; when 102%, 8.16 lines; when 103%, 8.24 lines; when 104%, 8.32 lines; when 105%, 8.4 lines; and when 106%, 8.48 lines. Also, the pitch (interval between sensors) gradually changes by 1% in the range of from 25% to 400%, other than the ones described above.

The above change occurs because the optical system such as the light source 25 moves in the vertical scanning direction at a different shift speed based on the magnification.

The relation of the pitch (line) between the respective CCD line sensors 34a, 34b and 34c, based on the scaling magnification described above is registered beforehand in the internal memory 101a in the control section 101 described later, or in the internal memory 120a in the scan CPU 120.

Figure 9:
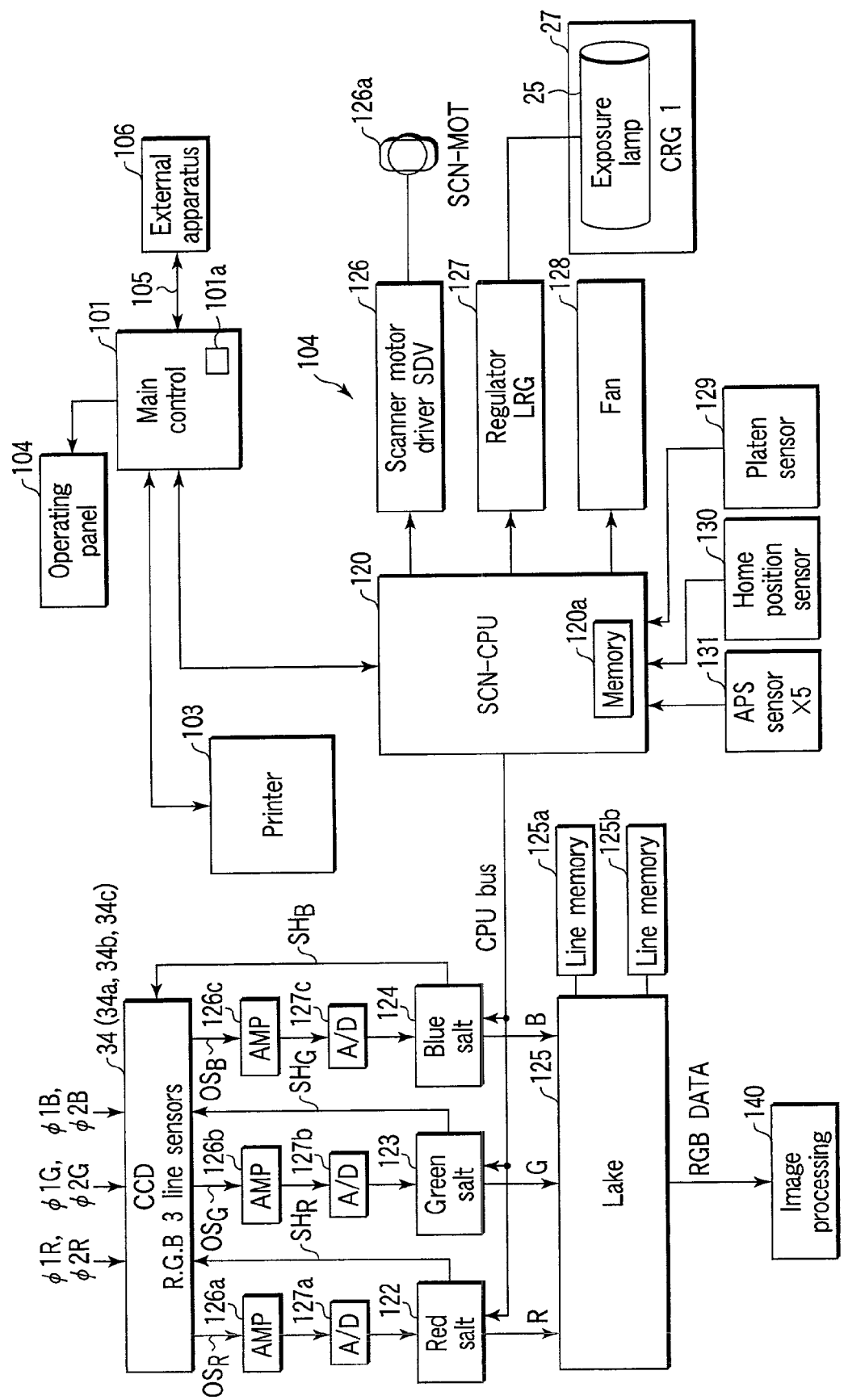
FIG. 9 is a block diagram showing the internal construction of a control circuit of the color image forming apparatus.

Next, the circuit construction of the above scanner section 4 will be described with reference to FIG. 9.

That is to say, an SCN-CPU 120 is provided as a control section which controls the whole scanner section 4. This SCN-CPU 120 is connected to the control section 101.

To this SCN-CPU 120 are connected the red color signal processing section (SALT) 122, the green color signal processing section (SALT) 123, the blue color signal processing section (SALT) 124 and an arithmetic unit (LAKE) 125, via a CPU bus 121. These respective processing sections are constructed by ASIC.

An output from the above-described CCD line sensor 34a (CCD output signal) is amplified by an amplifier 126a, and the signal converted to a digital signal by an analog-to-digital converter 127a is supplied to the red color signal processing section 122. The red color signal processing section 122 is to output a red color signal (R) in a unit of a pixel, which has been subjected to processing such as signal detection in the digital signal of the red color component supplied from the analog-to-digital converter 127a, level adjustment and mixing ratio adjustment, and this red color signal (R) is output to the arithmetic processing section 125. The red color signal processing section 122 is to output the shift gate signal SH-R to the CCD line sensor 34a at a different timing in accordance with the magnification supplied from the SCN-CPU 120.

An output from the above-described CCD line sensor 34b (CCD output signal) is amplified by an amplifier 126b, and the signal converted to a digital signal by an A/D converter 127b is supplied to the green color signal processing section 123. The green color signal processing section 123 is to output a green color signal (G) in a unit of a pixel, which has been subjected to processing such as signal detection in the digital signal of the green color component supplied from the analog-to-digital converter 127b, level adjustment and mixing ratio adjustment, and this green color signal (G) is output to the arithmetic processing section 125. The green color signal processing section 123 is to output the shift gate signal SH-G to the CCD line sensor 34b at a different timing in accordance with the magnification supplied from the SCN-CPU 120.

An output from the above-described CCD line sensor 34c (CCD output signal) is amplified by an amplifier 126c, and the signal converted to a digital signal by an analog-to-digital converter 127c is supplied to the blue color signal processing section 124. The blue color signal processing section 124 is to output a blue color signal (B) in a unit of a pixel, which has been subjected to processing such as signal detection in the digital signal of the blue color component supplied from the analog-to-digital converter 127c, level adjustment and mixing ratio adjustment, and this blue color signal (B) is output to the arithmetic processing section 125. The blue color signal processing section 125 is to output the shift gate signal SH-B to the CCD line sensor 34c at a different timing in accordance with the magnification supplied from the SCN-CPU 120.

The arithmetic processing section 125 is to perform the arithmetic processing such as white balance and gamma control with respect to each color signal (R, G, B) in a unit of a pixel from the red color signal processing section 122, the green color signal processing section 123 and the blue color signal processing section 124, and each color signal (R, G, B) is output to an image processing section 92 as a result of the processing.

Moreover, two line memories 125a and 125b are connected to the arithmetic processing section 125. The arithmetic processing section 125 stores a pixel signal delayed in a unit of a line by a delay circuit, in the line memories 125a and 125b, at a delay timing corresponding to the magnification supplied from the SCN-CPU 120, thereby the pixel signal can be used for correction of misregistration in a unit of a line of the respective CCD line sensors 34a, 34b and 34c.

For example, when a pixel signal for one line is supplied from the blue color signal processing section 124, the image data of the line supplied from the signal processing section 123, which is 8 lines ahead, is stored in the line memory 125a, and the image data of the line supplied from the signal processing section 123, which is 16 lines ahead with respect to the line supplied from the signal processing section 124, is stored in the line memory 125b. As a result, the image data for each color on the same line in the document D is output to the image processing section 140.

When the magnification is 100%, since the shift gate signals SH-R, SH-G, SH-B are synchronous, each color image data becomes complete by the shift gate signal for 16 times.

When the magnification is 106%, since the shift gate signals SH-R, SH-G, SH-B are asynchronous, and deviated by ½ line, each color image data becomes complete by the shift gate signal for 17 times.

To the above-described SCN-CPU 120 are connected a scanner motor driver (SDV) 126 which drives the scanner motor 16, a regulator (LRG) 127 which controls lighting of the light source 25, a cooling fan (FAN) 128, a platen sensor 129 which detects the existence of a document on the document table 8, a home position sensor 130 which detects the top position of the document on the document table 8, and an automatic paper size (APS) sensor 131 which detects the size of the document on the document table 8.

In the above-described construction, the scanning processing based on the magnification will now be described.

At first, the scanning processing when a copy at magnification setting of 100% is instructed will be described.

That is to say, based on turning on of the copy key, the control section 101 reads 8 lines as a pitch between sensors based on the magnification setting of 100% from the internal memory 101a, and outputs it to the scan CPU 120.

As a result, the scan CPU 120 outputs a timing signal of the shift gate signals SH-R, SH-G, SH-B, synchronized with respect to the respective signal processing sections 122, 123 and 124. As a result, the signal processing sections 122, 123 and 124 output the synchronized shift gate signals SH-R, SH-G, SH-B, as shown in FIG. 10A.

Moreover, the scan CPU 120 does not set a delay with respect to the output from the signal processing section 122 by means of the arithmetic processing section (LAKE) 125, and sets a delay for 8 signals of the shift gate signal SH-R with respect to the output from the signal processing section 123, and sets a delay for 16 signals of the shift gate signal SH-R with respect to the output from the signal processing section 124.

By the above setting, the signal processing sections 122, 123 and 124 output the shift gate signals SH-R, SH-G, SH-B at the synchronized same timing, respectively. Moreover, the transfer clocks φ1R, φ2R, φ1G, φ2G, φ1B and φ2B are supplied at the same timing, as shown in FIGS. 10B and 10C.

As a result, the CCD output signal for each color of the CCD line sensors 34a, 34b and 34c becomes image data shifted by 8 lines, as shown in FIGS. 10D, 10E and 10F, and guided to the signal processing sections 122, 123 and 124. Thereby, the signal processing sections 122, 123 and 124 output the image data in a unit of a line to the arithmetic processing section 125, synchronous to the respective shift gate signal.

Moreover, the arithmetic processing section 125 receives the image data for each line of each color of the signal processing sections 122, 123 and 124, synchronous to the shift gate signal SH-R, and the image data from the signal processing section 122 is subjected to the delay processing for 16 lines based on the shift gate signal SH-R, and the image data from the signal processing section 123 is subjected to the delay processing for 8 lines based on the shift gate signal SH-R. These delayed image data are stored in the line memories 125b and 125a, respectively.

That is to say, at present, the image data of the line supplied from the signal processing section 123 which is 8 lines ahead with respect to the line supplied from the signal processing section 124 is stored in the line memory 125a, and the image data of the line supplied from the signal processing section 123 which is 16 lines ahead with respect to the line supplied from the signal processing section 124 is stored in the line memory 125b.

Therefore, when the image data for the blue color of the 17th line is supplied from the signal processing section 124, based on the shift gate signal SH-R, as shown in FIG. 10G, the arithmetic processing section 125 outputs the image data for the green color of the 17th line stored in the line memory 125a, and the image data for the red color of the 17th line stored in the line memory 125b, together with the image data for the blue color, at the same time to the image processing section 140, as shown in FIGS. 10H, 10I and 10J.

Next, the scanning processing when a copy at a magnification setting of 106% is instructed will be described.

That is to say, based on turning on of the copy key, the control section 101 reads 8.48 lines as a pitch between sensors based on the magnification setting of 106% from the internal memory 101a, and outputs it to the scan CPU 120.

As a result, the scan CPU 120 outputs a timing signal of the shift gate signals SH-R, SH-G, SH-B, corresponding to the shift amount based on the above-described pitch between sensors, with respect to the respective signal processing sections 122, 123 and 124. As a result, the signal processing sections 122, 123 and 124 output the shift gate signals SH-R, SH-G, SH-B corresponding to the shift amount, as shown in FIGS. 11A, 11B and 11C. At this time, the shift gate signals SH-R and SH-B are shifted substantially by one line, and hence, a synchronized signal is used.

Moreover, the scan CPU 120 sets a delay for one signal of the shift gate signal SH-R, with respect to the output from the signal processing section 122 by means of the arithmetic processing section (LAKE) 125, sets a delay for 9 signals of the shift gate signal SH-R with respect to the output from the signal processing section 123, and sets a delay for 17 signals of the shift gate signal SH-R with respect to the output from the signal processing section 124.

By the above setting, the signal processing sections 122 and 124 output the shift gate signals SH-R and SH-B at the synchronized same timing, respectively, and the signal processing section 123 outputs the shift gate signal SH-G at a timing delayed by ½ line. Moreover, the transfer clocks φ1R, φ2R, φ1B and φ2B are supplied at the same timing, as shown in FIGS. 11D, 11E, 11H and 11I. The transfer clocks φ1G and φ2G are supplied at a timing delayed by ½ line, as shown in FIGS. 11F and 11G.

As a result, the CCD output signal for each color of the CCD line sensors 34a, 34b and 34c becomes image data shifted by 8 lines, as shown in FIGS. 11J, 11K and 11L, and the CCD output signal of the CCD line sensor 34b is guided to the signal processing section 123 at a timing delayed by ½ line. Thereby, the signal processing sections 122, 123 and 124 output the image data in a unit of line to the arithmetic processing section 125, synchronous to the respective shift gate signal.

Moreover, the arithmetic processing section 125 receives the image data for each line of each color of the signal processing sections 122, 123 and 124, synchronous to the shift gate signal SH-R. The image data from the signal processing section 122 is subjected to the delay processing for 17 lines based on the shift gate signal SH-R, the image data from the signal processing section 123 is subjected to the delay processing for 8 lines based on the shift gate signal SH-R, and the image data from the signal processing section 124 is subjected to the delay processing for one line based on the shift gate signal SH-R. The delayed image data from the signal processing section 123 is stored in the line memory 125b, and the delayed image data from the signal processing section 122 is stored in the line memory 125a.

That is to say, at present, the image data of the line supplied from the signal processing section 123 which is 8 lines ahead with respect to the line supplied from the signal processing section 124 is stored in the line memory 125a, and the image data of the line supplied from the signal processing section 123 which is 16 lines ahead with respect to the line supplied from the signal processing section 124 is stored in the line memory 125b.

Therefore, when the image data for the blue color of the 17th line is supplied from the signal processing section 124, based on the shift gate signal SH-R, shown in FIG. 11M, the arithmetic processing section 125 outputs the image data for the green color of the 17th line stored in the line memory 125a, and the image data for the red color of the 17th line stored in the line memory 125b, together with the image data for the blue color, at the same time to the image processing section 140, as shown in FIGS. 11N, 11O and 11P. As a result, the registered image data is supplied.

This registered image data is subjected to the image processing in the image processing section 140, and thereafter, is printed out in a color printer section 103.

The above example is a case where the magnification is 106%, and in the case of other magnifications, the processing is performed similarly.

As described above, the scanning timing of the CCD line sensor is changed, in accordance with the scanning misregistration amount, thereby enabling accurate correction with respect to the misregistration of less than one line. With the scanner using the color CCD sensor, misregistration of less than one line which occurs at the time of enlargement and reduction can be corrected.

Moreover, when the magnification is 106%, since the scanning timing is delayed by ½ line, the MTF is not degraded, and hence image reproduction with fidelity becomes possible.

Furthermore, by adjusting the timing of the shift gate signal and the transfer clock for each color of the CCD line sensor, that is, by controlling the shift gate signal and the transfer clock, the transfer clock can be output continuously for one line, and hence adaptation for high-speed driving is possible.

With respect to the image scanning misregistration of less than one line, the input timing of the shift gate signal to each CCD line sensor of RED, GREEN and BLUE can be controlled corresponding to the scanning misregistration, independently for each CCD line sensor of RED, GREEN and BLUE.

Furthermore, the input timing of the shift gate signal and the transfer clock to the CCD line sensor can be controlled corresponding to the scanning misregistration, independently for each CCD line sensor of RED, GREEN and BLUE.

By designating the shift amount of the shift gate signal as a multiple of the transfer clock, the correction can be performed at accuracy for the number xx of pixels of the CCD line sensor.

Figure 12:
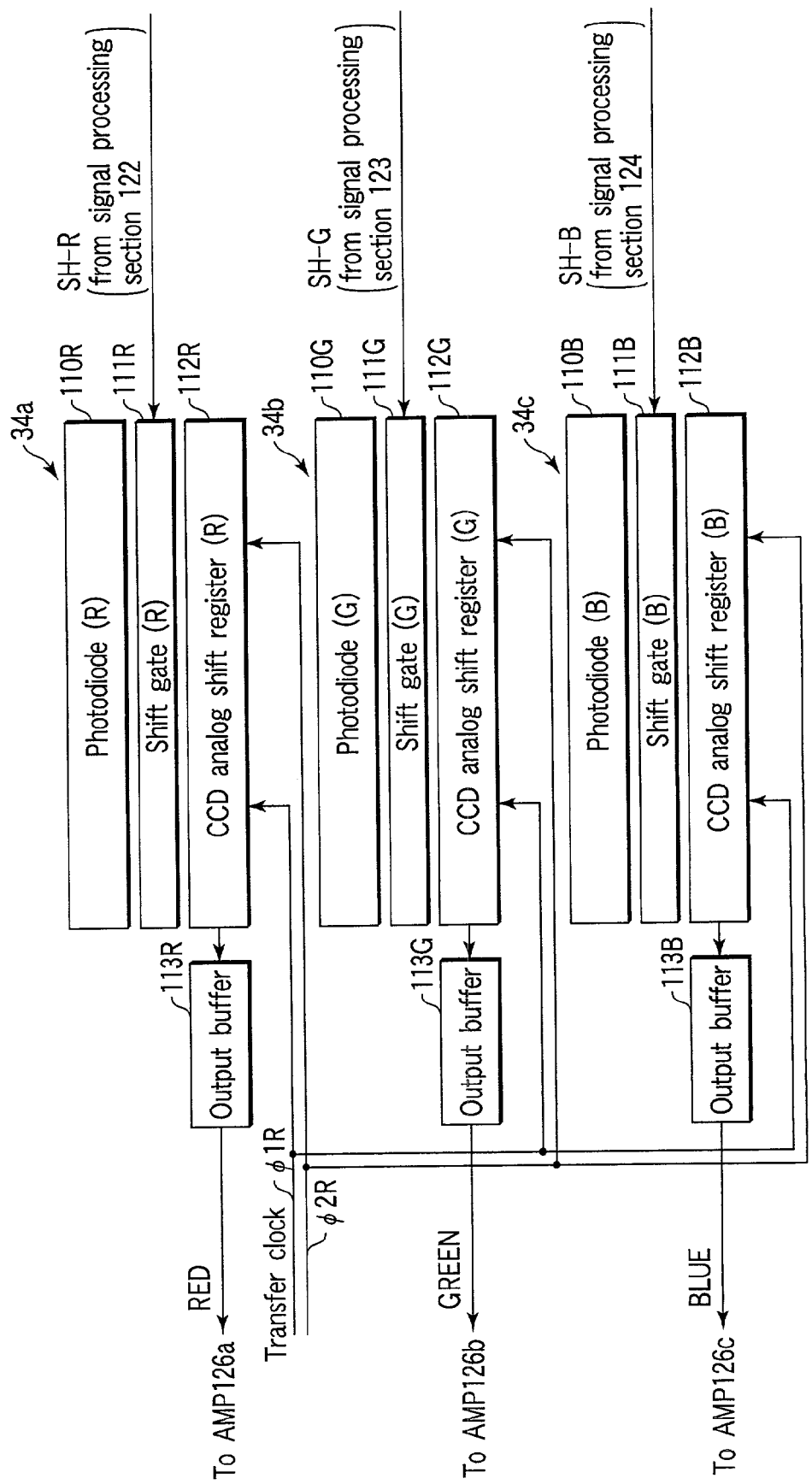
FIG. 12 is a diagram showing the construction of the CCD line sensor.

In the above embodiment, the description has been made of a case where the transfer clock is supplied separately to each CCD line sensor. However, the present invention is not limited thereto, and as shown in FIG. 12, the operation is similarly performed even in the case where the transfer clocks φ1 and φ2 are supplied commonly to each CCD line sensor.

In this case, however, as shown in FIGS. 13A, 13B and 13C, while the shift gate signals SH-R, SH-G, SH-B are output, the transfer clocks φ1 and φ2 halt, as shown in FIGS. 13D and 13E. By the halt of these transfer clocks φ1 and φ2, the output of the CCD output signal for each color of the CCD line sensors 34a, 34b and 34c is interrupted, as shown in FIGS. 13F, 13G and 13H.

Therefore, when the image data for the blue color of the 17th line is supplied from the signal processing section 124, based on the shift gate signal SH-R, as shown in FIG. 13I, the arithmetic processing section 125 outputs the image data for the green color of the 17th line stored in the line memory 125a, and the image data for the red color of the 17th line stored in the line memory 125b, together with the image data for the blue color, at the same time to the image processing section 140, as shown in FIGS. 13J, 13K and 13L.

The above embodiment is for the case where the magnification is 106%, but is similarly performed for the case where other magnifications are used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A document scanning apparatus comprising:

a scanning section which reads and scans a document line by line in the horizontal scanning direction thereof, with a relative movement of the document in the vertical scanning direction;

a shift mechanism which shifts said scanning section and said document relative to each other in the vertical scanning direction of said document, at various speeds based on the scanning magnification;

a CCD line sensor for the color red, to which an image for each line is guided from said scanning section, to convert it into pixel signals of a plurality of pixels based on the density of the red color component;

a CCD line sensor for the color green provided parallel with said CCD line sensor for the color red with a predetermined distance therebetween, to which an image for each line is guided from said scanning section, to convert it into pixel signals of a plurality of pixels based on the density of the green color component;

a CCD line sensor for the color blue provided parallel with said CCD line sensor for the color green with a predetermined distance therebetween, to which an image for each line is guided from said scanning section, to convert it into pixel signals of a plurality of pixels based on the density of the blue color component;

a memory section which stores beforehand alienation time comprising a line unit component and a pixel unit component between said respective CCD line sensors, in such a state that said scanning section and said document are relatively shifted by said shift mechanism, at a different speed based on various scanning magnifications;

a modification section which, at the time of scanning at a predetermined scanning magnification, reads the alienation time between said respective CCD line sensors based on this magnification, and modifies the output timing of the pixel signal from said each CCD line sensor, based on the pixel unit component of this readout alienation time; and a delay section which delays the pixel signal in a unit of one line, obtained by changing the output timing of the pixel signal from each said CCD line sensor by the modification section, by the line unit component of said alienation time.

2. A document scanning apparatus according to claim 1, wherein said each CCD line sensor comprises: a sensing element sequence for a plurality of pixels which converts into a pixel signal based on the density of the corresponding color component for each pixel of the image, respectively; a shift section which shifts the pixel signal for each pixel in this sensing element sequence, based on a seizing signal for each one line in the horizontal scanning direction; and a transfer section which sequentially transfers the pixel signal for each pixel shifted by the shift section, pixel by pixel based on the supplied transfer clock;

wherein said modification section modifies the timing of the seizing signal supplied to each CCD line sensor based on the pixel unit component in said alienation time.

3. A document scanning apparatus according to claim 2, wherein the transfer clock supplied to the transfer section of each said CCD line sensor is supplied separately, respectively, and the supply of said transfer clock is interrupted, only while the seizing signal to the same CCD line sensor is being supplied.

4. A document scanning apparatus according to claim 2, wherein the timing of the seizing signal that is modified by said modification section is a multiple of said transfer clock.

5. A document scanning apparatus according to claim 1, wherein said each CCD line sensor is provided parallel with each other on the same substrate.

6. An image forming apparatus comprising:

a setting section which sets a scanning magnification at the time of forming an image;

a scanning section which reads and scans a document line by line in the horizontal scanning direction, with a relative movement of the document in the vertical scanning direction;

a shift mechanism which shifts said scanning section and said document relative to each other in the vertical scanning direction of said document, at various speeds based on the scanning magnification set by said setting section;

a CCD line sensor for the color red, to which an image for each line is guided from said scanning section, to convert it into pixel signals of a plurality of pixels based on the density of the red color component;

a CCD line sensor for the color green provided parallel with said CCD line sensor for the color red with a predetermined distance therebetween, to which an image for each line is guided from said scanning section, to convert it into pixel signals of a plurality of pixels based on the density of the green color component;

a CCD line sensor for the color blue provided parallel with said CCD line sensor for the color green with a predetermined distance therebetween, to which an image for each line is guided from said scanning section, to convert it into pixel signals of a plurality of pixels based on the density of the blue color component;

a memory section which stores beforehand alienation time comprising a line unit component and a pixel unit component between said respective CCD line sensors, in such a state that said scanning section and said document are relatively shifted at a different speed based on various scanning magnifications;

a modification section which, at the time of scanning at a predetermined scanning magnification, reads the alienation time between said respective CCD line sensors based on this magnification, and modifies the output timing of the pixel signal from said each CCD line sensor, based on the pixel unit component of this readout alienation time;

a delay section which delays the pixel signal in a unit of one line, obtained by changing the output timing of the pixel signal from said each CCD line sensor by the modification section, by the line unit component of said alienation time; and an image forming section which forms an image on an image forming medium, based on the pixel signal in a unit of one line for each color output from said delay section.

7. An image forming apparatus according to claim 6, wherein said each CCD line sensor comprises:

a sensing element sequence for a plurality of pixels which converts into a pixel signal based on the density of the corresponding color component for each pixel of the image, respectively; a shift section which shifts the pixel signal for each pixel in this sensing element sequence, based on a seizing signal for each one line in the horizontal scanning direction; and a transfer section which sequentially transfers the pixel signal for each pixel shifted by the shift section, pixel by pixel based on the supplied transfer clock;

wherein said modification section modifies the timing of the seizing signal supplied to each CCD line sensor based on the pixel unit component in said alienation time.

8. An image forming apparatus according to claim 7, wherein the transfer clock supplied to the transfer section of said each CCD line sensor is supplied separately, respectively, and the supply of said transfer clock is interrupted, only while the seizing signal to the same CCD line sensor is being supplied.

9. An image forming apparatus according to claim 7, wherein the timing of the seizing signal that is modified by said modification section is a multiple of said transfer clock.

10. An image forming apparatus according to claim 6, wherein said each CCD line sensor is provided parallel with each other on the same substrate.

11. A document scanning method in an apparatus comprising:

a scanning section which reads and scans a document line by line in the horizontal scanning direction thereof, with a relative movement of the document in the vertical scanning direction;

a shift mechanism which shifts said scanning section and said document relative to each other in the vertical scanning direction of said document, at various speeds based on the scanning magnification;

a CCD line sensor for the color red, to which an image for each line is guided from said scanning section, to convert it into pixel signals of a plurality of pixels based on the density of the red color component;

a CCD line sensor for the color green provided parallel with said CCD line sensor for the color red with a predetermined distance therebetween, to which an image for each line is guided from said scanning section, to convert it into pixel signals of a plurality of pixels based on the density of the green color component;

a CCD line sensor for the color blue provided parallel with said CCD line sensor for the color green with a predetermined distance therebetween, to which an image for each line is guided from said scanning section, to convert it into pixel signals of a plurality of pixels based on the density of the blue color component; and a memory section which stores beforehand alienation time comprising a line unit component and a pixel unit component between said respective CCD line sensors, in such a state that said scanning section and said document are relatively shifted by said shift mechanism, at a different speed based on various scanning magnifications;

wherein said method comprises:

modification of reading, at the time of scanning at a predetermined scanning magnification, the alienation time between said respective CCD line sensors based on this magnification and modifies the output timing of the pixel signal from said each CCD line sensor, based on the pixel unit component of this readout alienation time; and delaying the pixel signal in a unit of one line, obtained by changing the output timing of the pixel signal from said each CCD line sensor by said modification step, by the line unit component of said alienation time.

* * * * *